(12) United States Patent
Nihonmatsu et al.

(10) Patent No.: US 7,300,091 B2
(45) Date of Patent: Nov. 27, 2007

(54) SEAT SLIDING DEVICE FOR VEHICLE

(75) Inventors: Hideo Nihonmatsu, Anjo (JP);
Yasuhiro Kojima, Kariya (JP);
Yukifumi Yamada, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 11/638,490

(22) Filed: Dec. 14, 2006

(65) Prior Publication Data

US 2007/0145762 A1 Jun. 28, 2007

Related U.S. Application Data

(62) Division of application No. 11/062,428, filed on Feb. 23, 2005, now Pat. No. 7,195,303.

(30) Foreign Application Priority Data

Feb. 24, 2004 (JP) .............................. 2004-048189
Mar. 25, 2004 (JP) .............................. 2004-088175

(51) Int. Cl.
*B60N 2/02* (2006.01)
(52) U.S. Cl. .................... 296/65.13; 297/341; 248/429
(58) Field of Classification Search ............ 296/65.13, 296/65.14, 65.16; 297/341, 344.1; 248/429, 248/430, 421
See application file for complete search history.

(56) References Cited

U.S. PATENT DOCUMENTS

| | | | |
|---|---|---|---|
| 4,621,867 A | 11/1986 | Perring et al. | |
| 4,671,571 A | 6/1987 | Gionet | |
| 4,707,030 A | 11/1987 | Harding | |
| 4,881,774 A * | 11/1989 | Bradley et al. | 297/341 |
| 5,100,092 A * | 3/1992 | Sovis | 248/429 |
| 5,156,437 A * | 10/1992 | Hayakawa et al. | 297/344.1 |
| 5,531,503 A | 7/1996 | Hughes | |
| 5,605,377 A | 2/1997 | Tame | |
| 5,641,145 A | 6/1997 | Droulon et al. | |
| 5,688,026 A | 11/1997 | Reubeuze et al. | |
| 6,098,946 A * | 8/2000 | Sechet et al. | 297/341 |
| 6,123,379 A * | 9/2000 | Yamada et al. | 296/65.03 |
| 6,227,596 B1 | 5/2001 | Foucault et al. | |
| 6,257,541 B1 | 7/2001 | Timon et al. | |
| 6,328,272 B1 | 12/2001 | Hayakawa et al. | |
| 6,341,819 B1 * | 1/2002 | Kojima et al. | 297/341 |
| 6,435,465 B1 * | 8/2002 | Yamada et al. | 248/429 |
| RE37,990 E | 2/2003 | Yamada et al. | |

(Continued)

*Primary Examiner*—Kiran B. Patel
(74) *Attorney, Agent, or Firm*—Finnegan, Henderson, Farabow, Garrett & Dunner, LLP

(57) ABSTRACT

A seat sliding device for a vehicle for unlocking or retaining an unlocked state of a movable rail that supports a seat relative to a fixed rail by interlocking with a turning of a seat back in a forward direction or an operation of an operation handle, includes a link mechanism provided at one of a pair of rails which are arranged in parallel with each other by keeping a predetermined distance therebetween and a lock mechanism provided at the other one of the pair of rails. After the seat is moved in the forward direction with the seat back being turned forward, the link mechanism makes the lock mechanism inoperative so that the seat can be moved in a rearward direction regardless of a state of the seat back being positioned in the forward.

3 Claims, 14 Drawing Sheets

U.S. PATENT DOCUMENTS

| | | |
|---|---|---|
| 6,619,741 B1 | 9/2003 | Tame |
| 6,857,702 B2 * | 2/2005 | Becker et al. .............. 297/341 |
| 6,945,607 B2 | 9/2005 | Kojima |
| 6,953,178 B2 * | 10/2005 | Yamada et al. ............. 248/429 |
| 7,025,419 B2 * | 4/2006 | Sasaki et al. .......... 297/344.11 |
| 7,097,250 B2 | 8/2006 | Rausch et al. |
| 7,150,441 B2 * | 12/2006 | Leguede et al. ............ 248/423 |
| 2007/0145224 A1 * | 6/2007 | Yamada et al. ............. 248/429 |

* cited by examiner

FIG. 5
Front 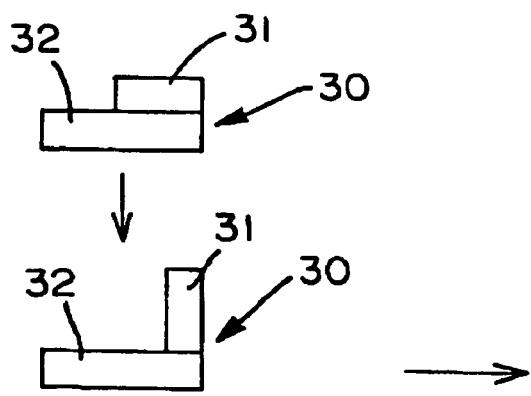  Rear 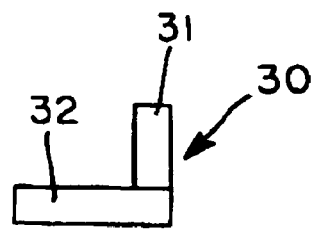
FIG. 6
Front 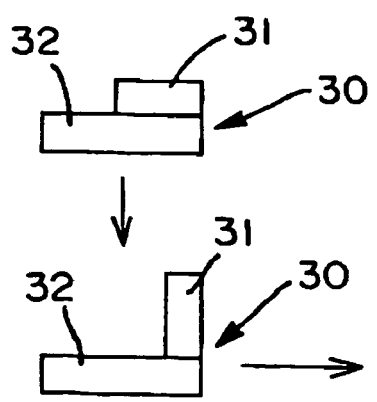  Substantially middle 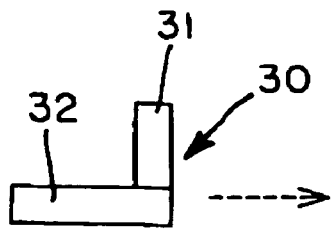  Rear 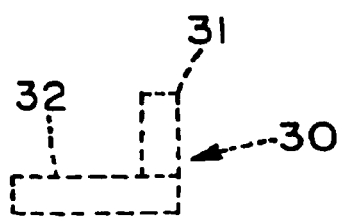

SEAT SLIDING DEVICE FOR VEHICLE

CROSS REFERENCE TO RELATED APPLICATIONS

This is a division of application Ser. No. 11/062,428, filed Feb. 23, 2005, now U.S. Pat. No. 7,195,303 which is based on and claims priority under 35 U.S.C. § 119 to Japanese Patent Application 2004-088175 and 2004-048189, filed on Mar. 25, 2004 and Feb. 24, 2004, respectively.

This application is based on and claims priority under 35 U.S.C. § 119 to Japanese Patent Application 2004-088175 and 2004-048189, filed on Mar. 25, 2004 and Feb. 24, 2004 respectively, the entire content of which is incorporated herein by reference.

FIELD OF THE INVENTION

This invention generally relates to a seat sliding device for a vehicle.

BACKGROUND

In order to make it easy for a passenger to get on to or off from a rear seat (i.e. walk-in operation), it is known to turn down a seatback of a front seat in a vehicle forward direction for the purposes of canceling a locked state (i.e. engaging state) of an upper rail for supporting the seat relative to a lower rail fixed to a vehicle seat, and then to move the front seat in the forward direction. In addition, an original position of the seat is stored (memory function) so that the seat can be returned to that position after the passenger gets on to or off from the rear seat. Such seat sliding device for a vehicle is disclosed in U.S. Pat. Nos. 5,688,026 and 6,227,596.

According to the seat sliding device disclosed in the above publications, the seat returns to the stored original position, i.e. where a memory retaining runner is locked (i.e. engages) relative to the lower rail, with the seatback being turned down after the passenger gets on to or off from the rear seat. Then, the slide operation of the upper rail relative to the lower rail is prohibited when the seatback is turned up. The seat can be locked in a forward position relative to the position of the memory retaining runner. In this case, the engagement of the memory retaining runner relative to the lower rail is released through the normal operation of the seat afterwards.

When the seatback is turned up in the forward position relative to the memory retaining runner, the seat is prohibited to move. That is, the sliding operation of the seat is restricted. In this state, a sufficient space is not provided in front of the seat for the passenger to access the seat. Thus, the sliding operation of the seat should be permitted by operating an operation handle so that the seat is moved to a position with which the passenger can get onto the seat.

In addition, according to the seat sliding device disclosed in the above publications, the seatback can be turned up in the forward position relative to the position of the memory retaining runner where the locked state of the sliding operation of the seat is obtained so that the memory of the seat position can be deleted. At this time, if the memory retaining runner disengages rapidly from the lower rail in case of the normal operation of the seat even if the engagement of the memory retaining runner with the lower rail is not strong, a lock mechanism of the memory retaining runner may be damaged. Further, since a large force is added to the memory retaining runner by a rearward movement of the seat, the memory retaining runner and the memory lock mechanism may be damaged and malfunction.

SUMMARY OF THE INVENTION

According to an aspect of the present invention, a seat sliding device for a vehicle for unlocking or retaining an unlocked state of a movable rail that supports a seat relative to a fixed rail by interlocking with a turning of a seat back in a forward direction or an operation of an operation handle, includes a link mechanism provided at one of a pair of rails which are arranged in parallel with each other by keeping a predetermined distance therebetween and a lock mechanism provided at the other one of the pair of rails. After the seat is moved in the forward direction with the seat back being turned forward, the link mechanism makes the lock mechanism inoperative so that the seat can be moved in a rearward direction regardless of a state of the seat back being positioned in the forward.

According to another aspect of the present invention, a seat sliding device for a vehicle includes a lower rail fixed to a vehicle floor, an upper rail slidable relative to the lower rail, a memory retaining runner including a memory lock that receives a biasing force of a biasing means and being slidable relative to a memory rail in a vehicle longitudinal direction, the memory retaining runner being biased in a vehicle forward direction by a spring engaging with the memory rail and the memory runner, the memory rail including a plurality of bores used for memorizing a seat position and fixed to the lower rail, a memory retaining runner including a memory lock that receives a biasing force of a biasing means and being slidable relative to a memory rail in a vehicle longitudinal direction, the memory retaining runner being biased in a vehicle forward direction by a spring engaging with the memory rail and the memory runner, the memory rail including a plurality of bores used for memorizing a seat position and fixed to the lower rail, a frame fixed to the upper rail, a first link rotatably connected to the frame and being able to make contact with the memory retaining runner, a second link and a third link connected to the frame by means of a fourth pin and being rotated in a predetermined direction due to a turning of a seat back in a forward direction; the third link including a first pin and an elongated bore within which the fourth pin is positioned, a fourth link rotatably connected to the frame by means of a rod and including an operating portion at one end which makes in contact with the operation handle and a portion at the other end which makes in contact with the first pin; the rod being rotatably connected to a sixth link which is able to make contact with the memory lock, a fifth link rotatably connected to the frame and including a portion which makes contact with a second pin fixed to the fourth link, and a seventh link rotatably connected to the frame and including an elongated bore at one end which receives a third pin of the second link and the other end which is rotatably connected to the fifth link.

According to further another aspect of the present invention, a sliding device for a vehicle includes a memory retaining runner provided at a fixed rail so as to be slidable in a longitudinal direction thereof and to which a memory lock engaging or disengaging relative to the fixed rail in response to a movement of an operating link is rotatably connected, and a frame fixed to a movable rail and rotatably connected to the operating link and a locking link. One end of the operating link interlockes with an operation handle for engaging or disengaging the movable rail relative to the fixed rail, and the other end of the operating link interlockes with a turning down and a turning up of a seat back. The memory retaining runner is connected to a spring for biasing the memory retaining runner in a predetermined direction and is able to make contact with the locking link rotatably connected to the frame. The memory runner is held on the movable rail by the locking link and the spring while the memory runner is held on the fixed rail when the memory runner engages with a memory rail provided at the fixed rail.

BRIEF DESCRIPTION OF THE DRAWINGS

The foregoing and additional features and characteristics of the present invention will become more apparent from the following detailed description considered with reference to the accompanying drawings, wherein:

FIG. 5 is an explanatory view of a further another example of a rearward (return) movement of the seat;

FIG. 6 is an explanatory view of a further another example of a rearward (return) movement of the seat;

DETAILED DESCRIPTION

Figure 1:
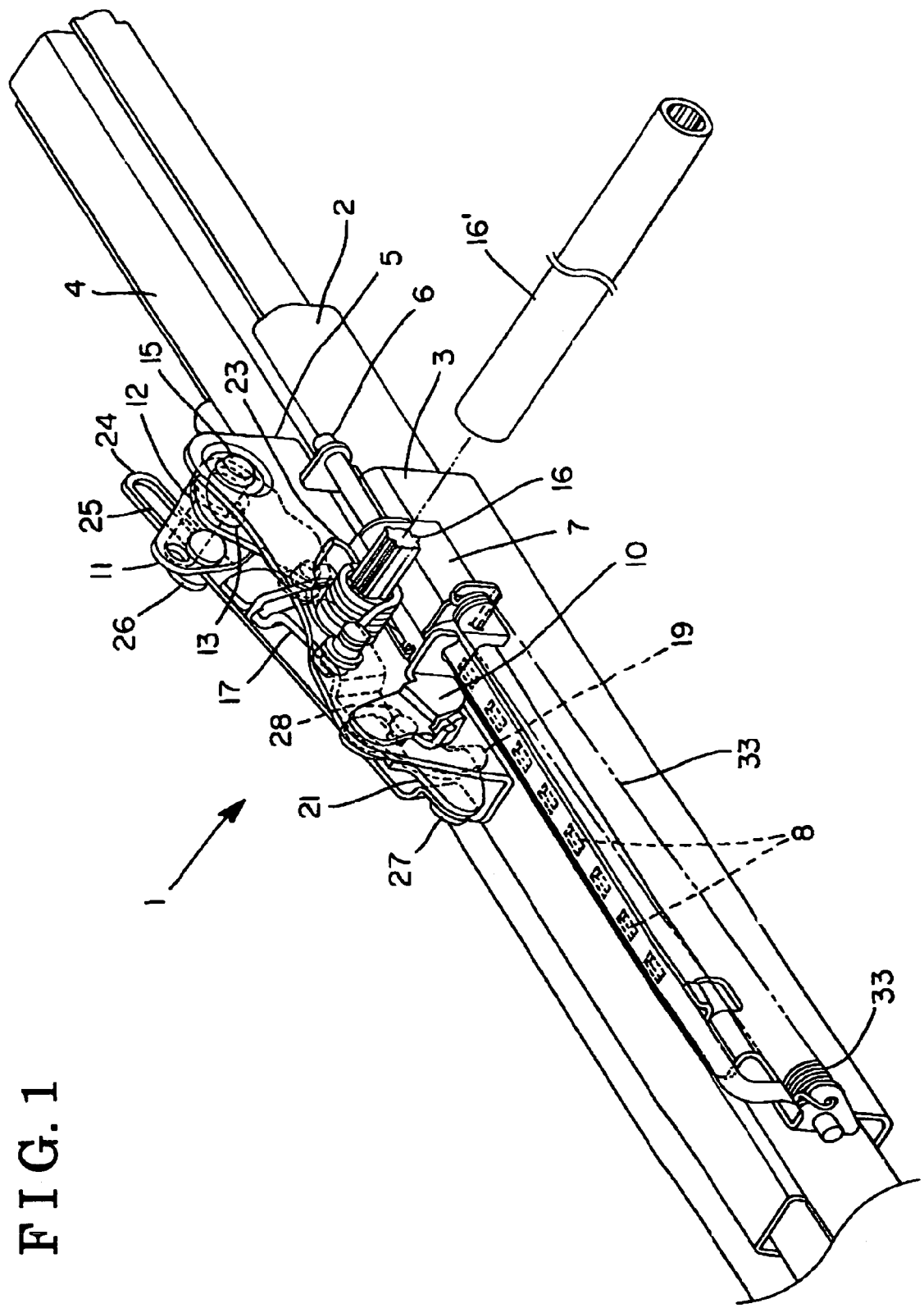
FIG. 1 is a perspective view of a seat sliding device for a vehicle according to an embodiment of the present invention.
Figure 2:
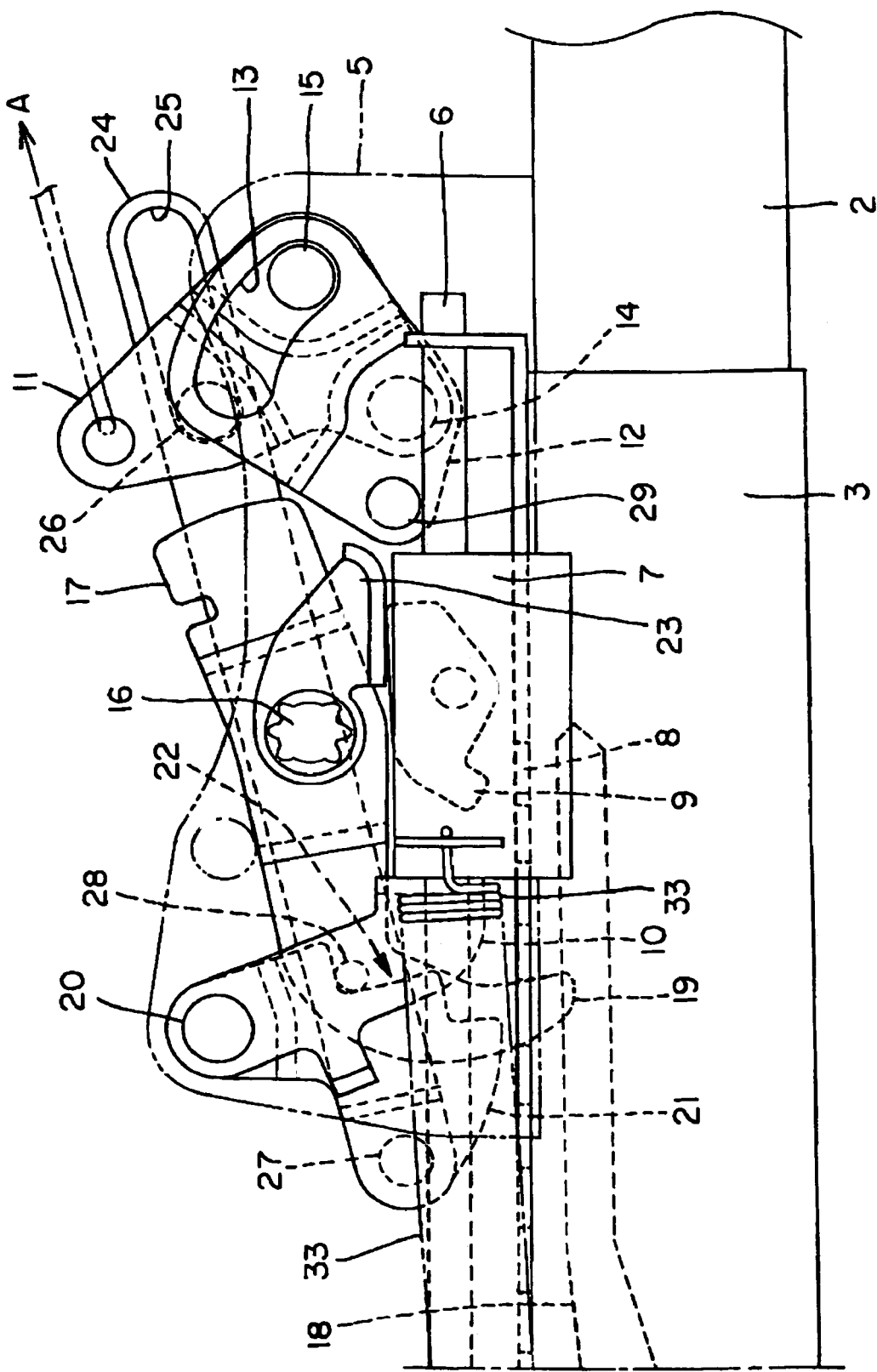
FIG. 2 is a front view of FIG. 1.

An embodiment of the present invention is explained with reference to the attached drawings. As shown in FIGS. 1 and 2, a vehicle seat sliding device 1 includes one of a pair of lower rails 2 fixed to a vehicle floor, a memory rail 3 fixed to the one of the lower rails 2, one of a pair of upper rails 4 slidable relative to the lower rail 2, and an L-shaped frame 5 fixed to a top face of the upper rail 4. A guiding shaft 6 is supported by the memory rail 3 and disposed into a memory retaining runner 7. The memory retaining runner 7 also engages with the memory rail 3 so as to be slidable on the memory rail 3 in a vehicle longitudinal direction.

The memory retaining runner 7 is engageable with multiple bores 8 formed on the memory rail 3 and includes a memory lock 9 that receives a biasing force of a spring. The memory retaining runner 7 is engageable with an end portion of a first link 10 rotatably supported on a sidewall portion, i.e. a portion extending in a vertical direction in FIG. 1, of the frame 5. In addition, the memory retaining runner 7 is held to be constantly biased in the forward direction in the vehicle by a first spring 33 whose one end engages with a tip end portion of the memory rail 3.

As shown in FIGS. 1 and 2, a second link 11 is provided at a rear end portion of the frame 5 while a third link 12 is provided along the sidewall portion of the frame 5 with keeping a distance with the second link 11. The third link 12 includes en elongated bore 13. The second link 11 is integrally connected to the third link 12 by means of a fourth pin 14. In addition, a fifth pin 15 rotatably connected to the frame 5 is positioned through the elongated bore 13 and also rotatably connected to the second link 11. Further, a fourth link 17, whose operating force is transmitted to the other vehicle seat sliding device (not shown) including the other one of the pair of upper rails and the other one of the pair of lower rails by means of rods 16 and 16', is rotatably connected to the frame 5. The fourth link 17 receiving a biasing force of a spring includes an operating portion 19 at an end portion that makes contact with an operation handle 18.

A fifth link 21 is rotatably connected to the frame 5 by means of a sixth pin 20. The fifth link 21 includes a two-stepped portion 22. A sixth link 23 that can make contact with the memory lock 9 is rotatably connected to the rod 16. An elongated seventh link 24 is supported by a third pin 26 positioned within an elongated bore 25 and rotatably connected to the second link 11, and a seventh pin 27 provided at a front end portion of the fifth link 21. The fourth link 17 includes a second pin 28 while the third link 12 includes a first pin 29.

Figure 3:
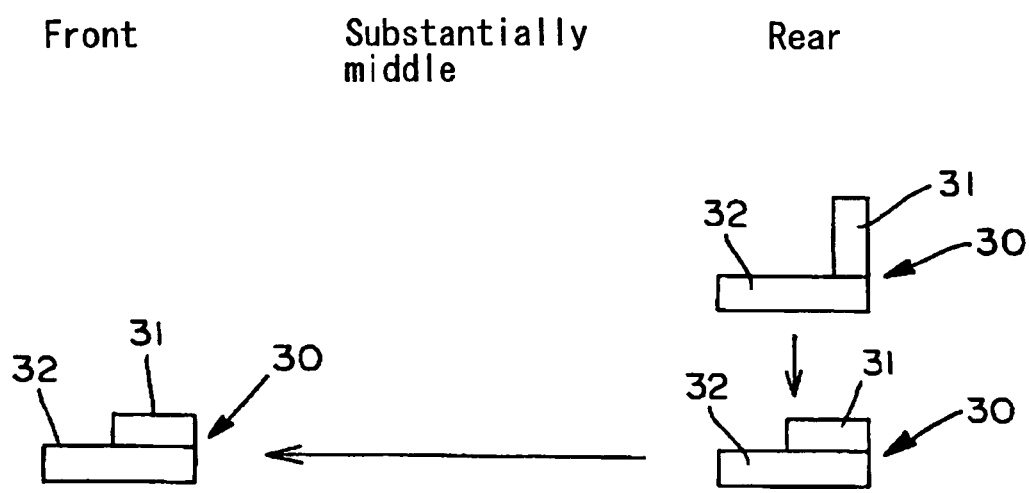
FIG. 3 is an explanatory view of an example of a rearward (return) movement of the seat.
Figure 4:
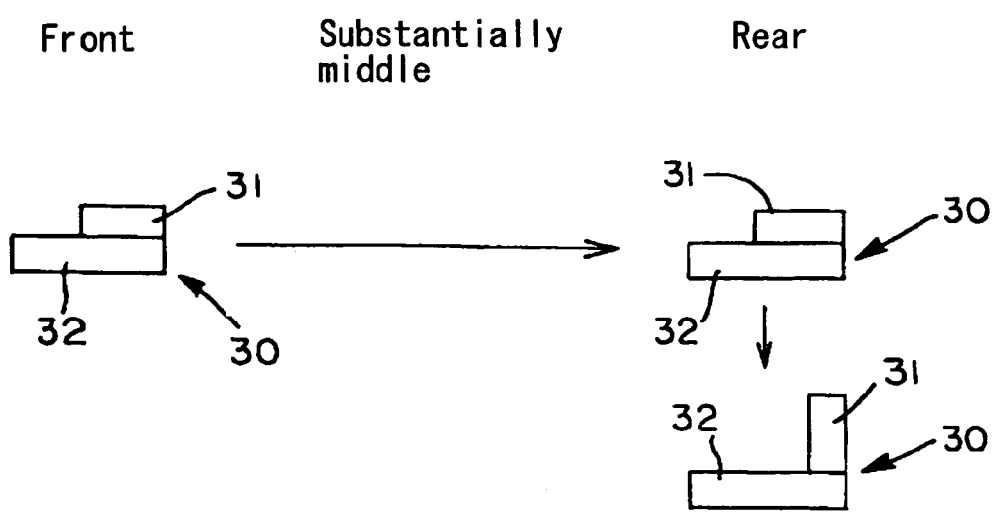
FIG. 4 is an explanatory view of an another example of a rearward (return) movement of the seat.

A forward movement and a restoring movement of a seat 30 for a walk-in operation are explained referring to FIGS. 3 to 5. Prior to the forward movement of the seat 30 that is positioned in the rearward, a seatback 31 is turned in the forward direction, i.e. folded towards a seat cushion 32. The seat 30 is then moved in the forward direction.

After the walk-in operation is completed, i.e. the passenger accesses or leaves a rear seat, the position of the seat 30 can be restored to an original seating position as shown in FIG. 4. According to an example of a restoring pattern of the seat 30 as shown in FIG. 4, the position of the seat 30 that has been moved in the forward direction is restored to the original seating position with the seatback 31 being turned town. Then, the seatback 31 is turned up. According to another example of the resorting pattern of the seat 30 as shown in FIG. 5, the seatback 31 of the seat 30 that has been moved in the forward direction is first turned up. Then, the position of the seat 30 is restored to the original seating position with the seat 30 being turned up.

Figure 7:
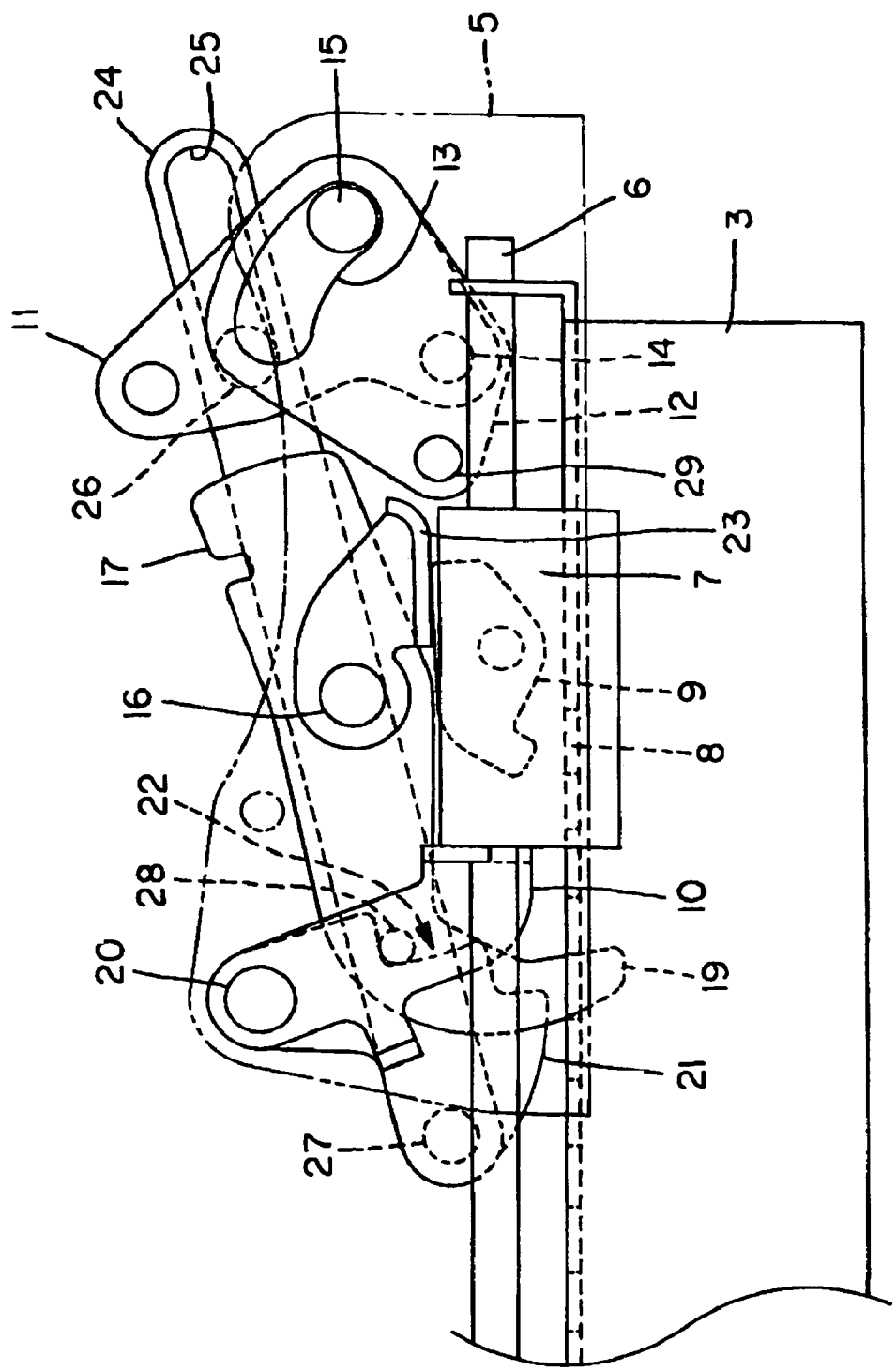
FIG. 7 is a front view showing a normal state of the seat.
Figure 8:
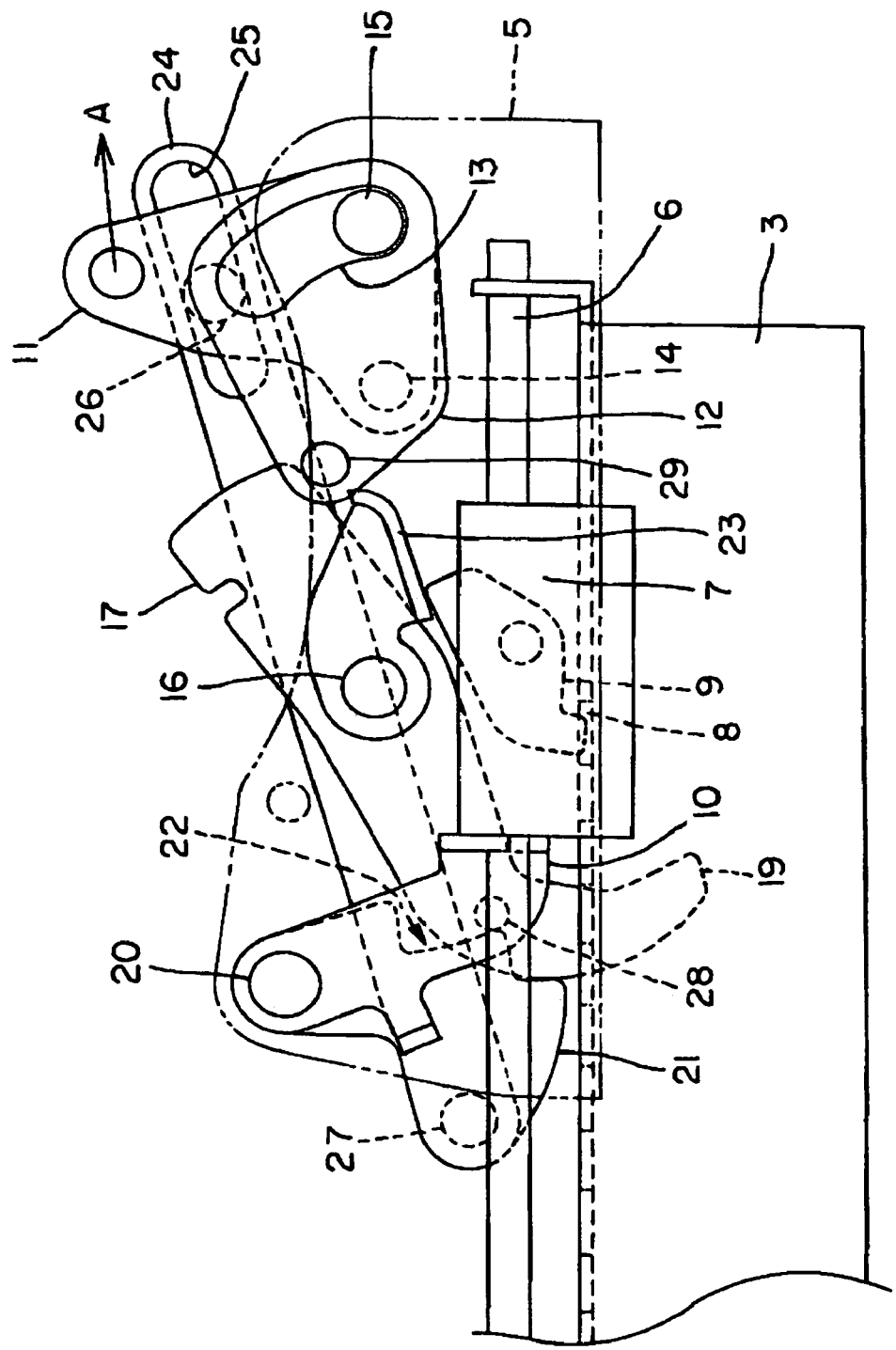
FIG. 8 is a front view showing a state in which a seatback is turned forward.
Figure 9:
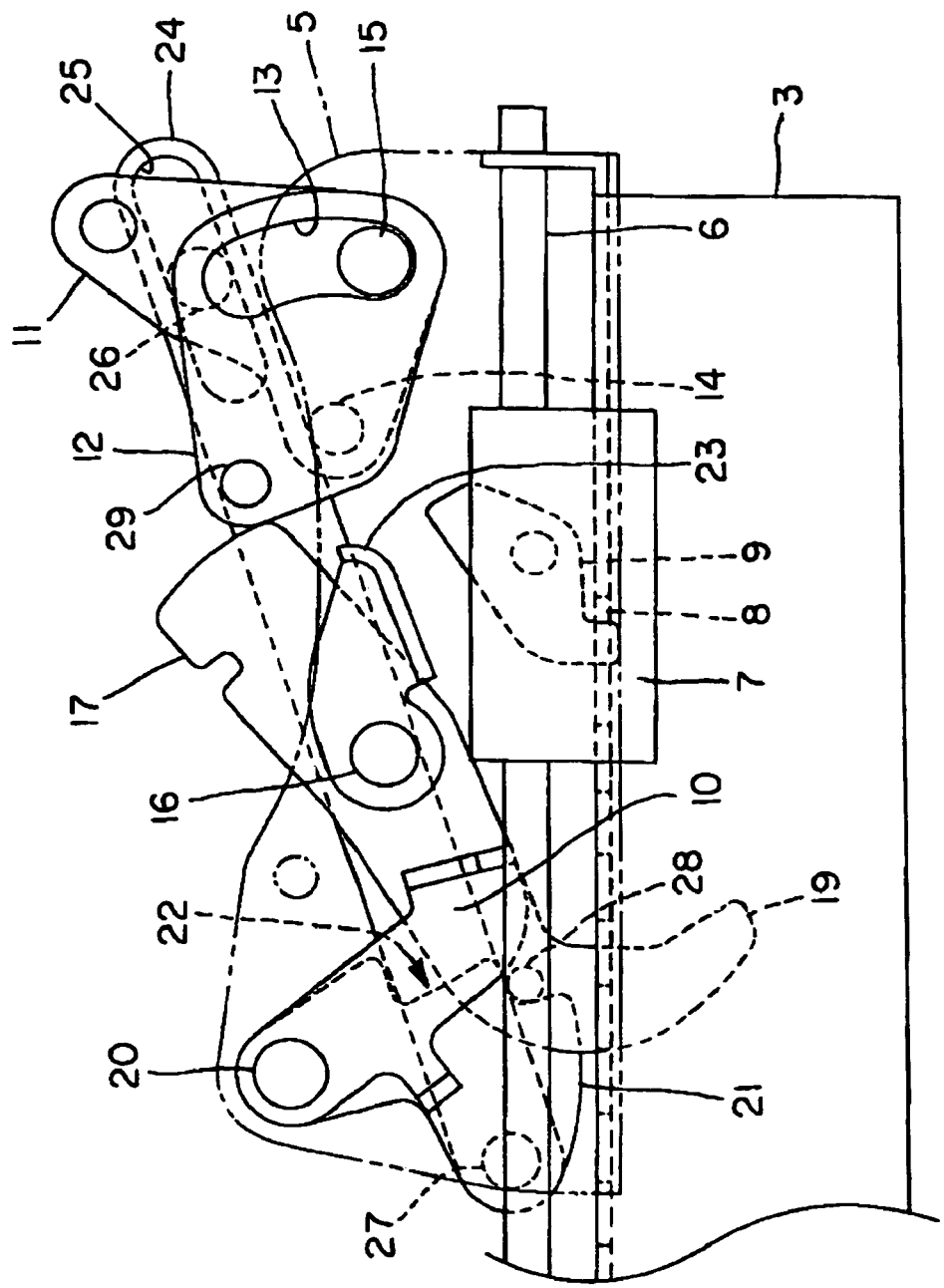
FIG. 9 is a front view showing a state in which the seat is moved in forward direction.

A mechanism of a forward movement of the seat 30 for the walk-in operation is explained referring to FIGS. 7 to 9, which corresponds to a state of FIG. 3. In response to the turning down of the seatback 31 in the forward direction, the second link 11 is rotated with reference to the fifth pin 15 in an arrow A direction (see FIG. 2). A downward movement of the operation handle 18 (see FIG. 2) (which enables the upper rail 4 to slide relative to the lower rail 2) activated by the movement of the second link 11 causes the fourth link 17 to rotate in the counterclockwise direction with reference to the rod 16 by means of the biasing force of the spring. That is, the operating portion 19 follows the movement of the operation handle 18. Accordingly, two ways of input to the seat sliding device 1 are obtained, i.e. the input to the second link 11 by means of the turning down of the seatback 31 in the forward direction, and the input to the fourth link 17 by means of the movement of the operating handle 18. The operation handle 18 is used for an engagement/disengagement device (not shown) for locking the upper rail 4 to the lower rail 2 or enabling the upper rail 4 to slide relative to the lower rail 2.

The memory retaining runner 7 is slidable along the guiding shaft 6 and the memory rail 3 by receiving the biasing force of the first spring 33. When the memory lock 9 engages with the bore 8 of the memory rail 3 or the first link 10 is in contact with the memory retaining runner 7, however, the memory retaining runner 7 is not slidable.

In the normal state of the seat 3 as shown in FIG. 7, the memory retaining runner 7 that receives the biasing force of the first spring 33 is in contact with the first link 10. Therefore, the memory retaining runner 7 is held on the side of the memory rail 3 which is fixed to the lower rail 2 even though the memory lock 9 disengages from the bore 8. When the upper rail 4 disengages from the lower rail 2 by means of the operation of the operation handle 18, the frame 5 is moved in conjunction with the upper rail 4. Then, the first link 10 is also moved in conjunction with the frame 5. As a result, the memory retaining runner 7 slides relative to the memory rail 3 by following the movement of the first link 10.

When the seatback 31 is turned down in the forward direction, the second link 11 is pulled in the arrow A direction as shown in FIG. 8. Then, the second link 11 is rotated in the clockwise direction with reference to the fifth pin 15. Since the third link 12 is integrally connected to the second link 11, the third link 12 is also rotated with reference to the fifth pin 15 in the clockwise direction, thereby causing the first pin 29 to raise a rear end of the fourth link 17. The rotation of the fourth link 17 in the counterclockwise direction with reference to the rod 16 causes the operating portion 19 to push down the operation handle 18. The downward movement of the operation handle 18 then releases the engagement of the upper rail 4 with the lower rails 2 so as to permit the upper rail 4 to slide relative to the lower rail 2. The rotation of the fourth link 17 in the counterclockwise direction causes the sixth link 23 to rotate in the counterclockwise direction. The memory lock 9 is rotated in the counterclockwise direction so as to engage with the bore 8. Then, the memory retaining runner 7 is prohibited to move on the memory rail 3 so that the position of the seat 30 can be stored as the original position (i.e. memory function).

Further, when the fourth link 17 is rotated in the counterclockwise direction, the second pin 28 fixed to the fourth link 17 engages with the fifth link 21 that is integrally fixed to the first link 10, i.e. precisely, the second pin 28 engages with a lower steppe portion of the two-stepped portion 22 of the fifth link 21 as shown in FIG. 9. As a result, the fourth link 17, which is biased to return to its initial position by means of the biasing force of the spring, is maintained at a position shown in FIG. 9. The seat 30 is then turned down in the forward direction (see FIG. 3) so that the walk-in operation is available.

Figure 10:
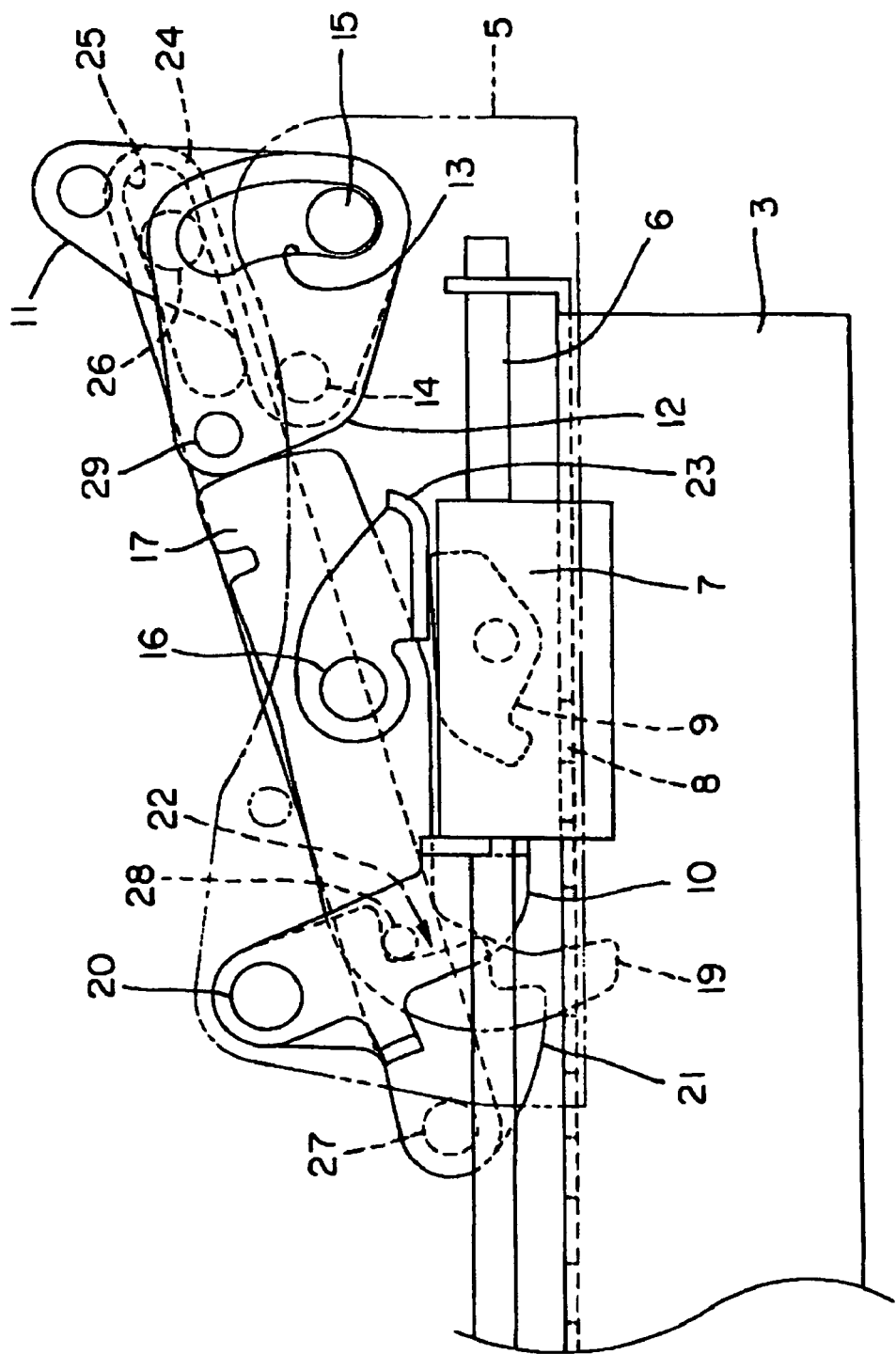
FIG. 10 is a front view showing a state in which the seat returns to a memory position.
Figure 11:
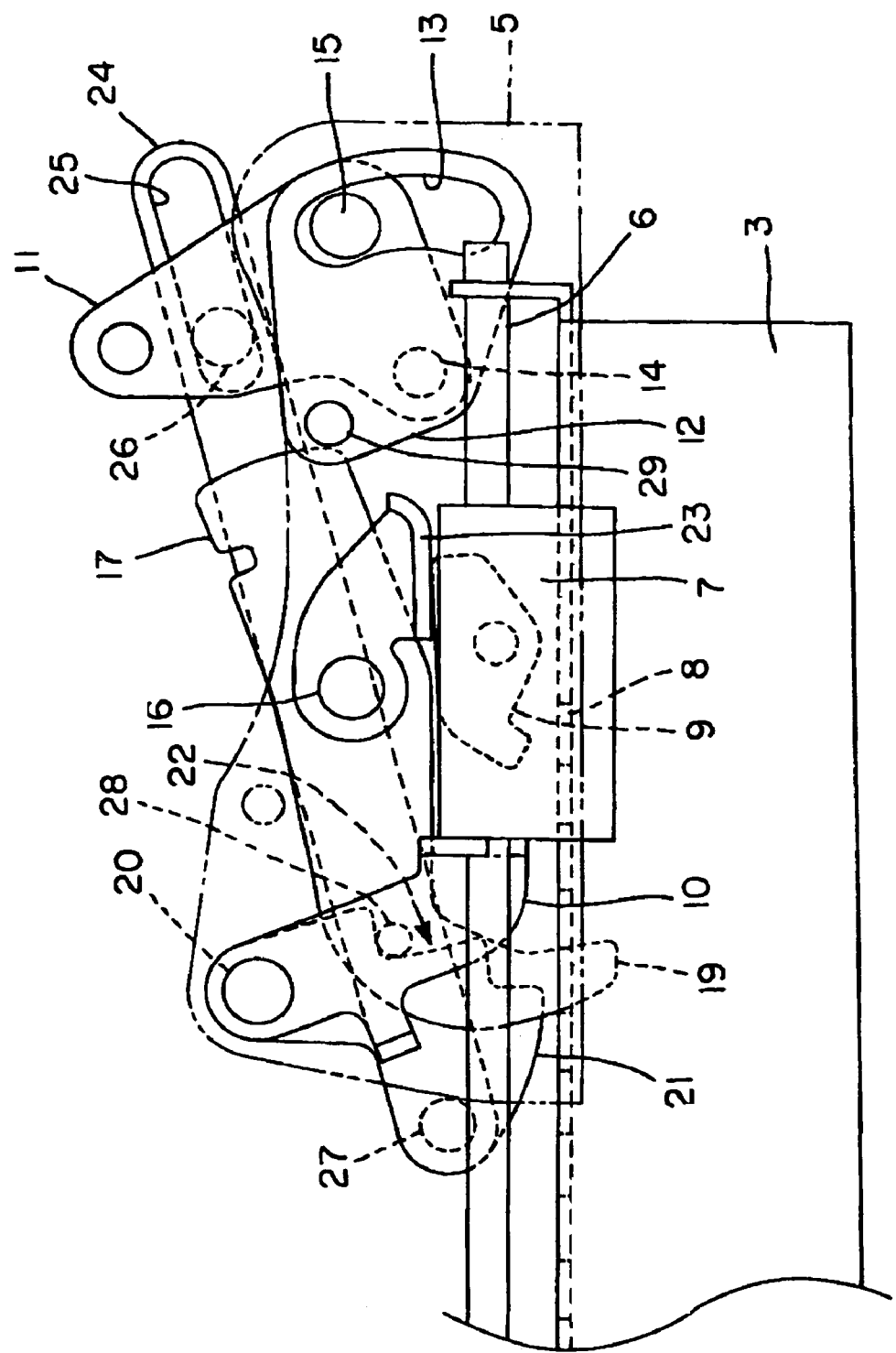
FIG. 11 is a front view showing a state in which the seatback is turned up from a state in FIG. 10.

A seat position restoring pattern performed after the completion of the walk-in operation is explained with reference to FIGS. 4 and 10. According to the seat position restoring pattern, the seat with the seatback 31 being turned down in the forward direction is moved back to a memory position (original position). Then, the upper rail 4 engages with the lower rail 2 (i.e. locked) followed by the turning up operation of the seatback 31. As shown in FIGS. 4 and 10, the first link 10 makes contact with the memory retaining runner 7 when the position of the seat 30 is moved back to the memory position. Then, the engagement between the second pin 28 of the fourth link 17 and the fifth link 21 is released. The fourth link 17 returns to the initial position in a rotating manner by means of the biasing force of the spring. At this time, the sixth link 23 integrally connected to the fourth link 17 is also rotated so as to push down the memory lock 9 of the memory retaining runner 7. The memory lock 9 disengages from the bore 8 accordingly. That is, the storage of the seat position is cancelled. The memory retaining runner 7 is held on the frame 5 side by means of the first link 10 and the first spring 33 (see FIGS. 1 and 2).

The returning of the fourth link 17 to the initial position causes the operation handle 18 to move in a locked direction so that the upper rail 4 engages with the lower rail 2. When the seatback 31 is turned up (see FIG. 4), the second link 11 is rotated to return to the initial position thereof (see FIG. 7) by means of the spring. At this time, the third link 12 is in contact with a rear end portion of the fourth link 17. However, when the elongated bore 13 of the third link 12 is rotated to be guided by the fifth pin 15 and then the second link 11 returns to the initial position, the third link 12 also returns to the initial position thereof by means of the spring.

Next, an operation conducted when the seatback 31 of the seat 30, which has been moved in the forward direction on the lower rails 2, is turned up as shown in FIG. 5 is explained with reference to FIG. 12.

Figure 12:
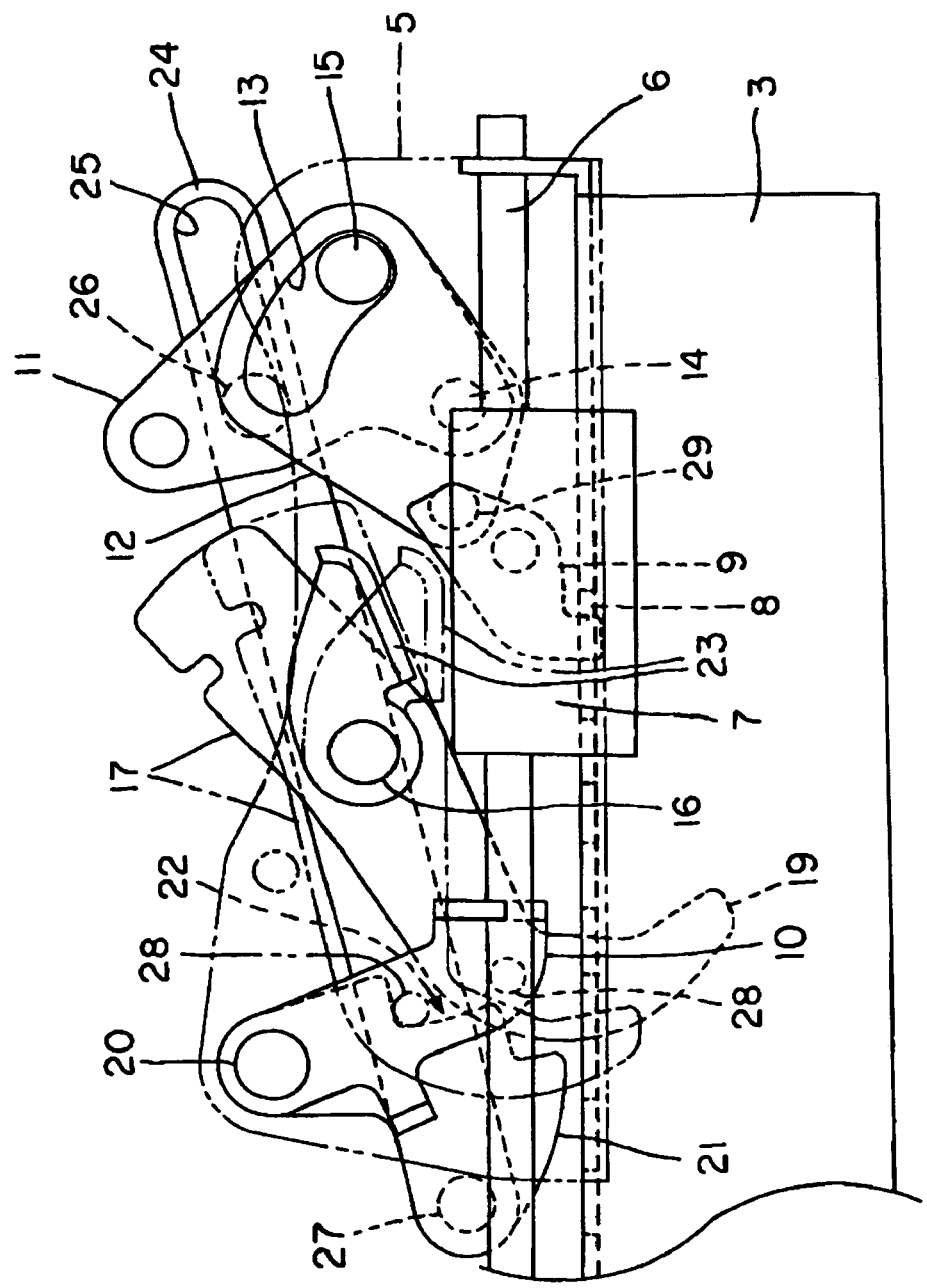
FIG. 12 is a front view showing a state in which the seatback is turned up before the seat is moved back to the memory position.

As shown in FIG. 12, when the seatback 31 is turned up, the second link 11 and the third link 12 are rotated by means of the biasing force of the spring so as to return to the initial positions thereof respectively. At this time, the third pin 26 is in contact with one end of the elongated bore 25 so as to forcedly rotate the fifth link 21. Then, the second pin 28 of the fourth link 17 disengages from the stepped portion 22 of the fifth link 21. The fourth link 17 and the sixth link 23 are rotated by the biasing force of the spring accordingly and return to an initial state (shown by a double-dashed line in FIG. 12).

The aforementioned initial state of the seat 3 with the seatback 31 being turned up is different from the normal state shown in FIG. 7 in a way in which the memory lock 9 engages with the bore 8. However, the upper rail 4 still engages with the lower rail 2. Then, the upper rail 4 is moved to the memory position through the normal operation, i.e. by operating the operation handle 18 so that the memory lock 9 disengages from the bore 8. The memory retaining runner 7 is held on the frame 5 side, i.e. a movable frame side by means of the first link 10 and the first spring 33. The normal state of the seat 30 (i.e. the upper rail 4 engages with the lower rail 2) is obtained accordingly.

Figure 13:
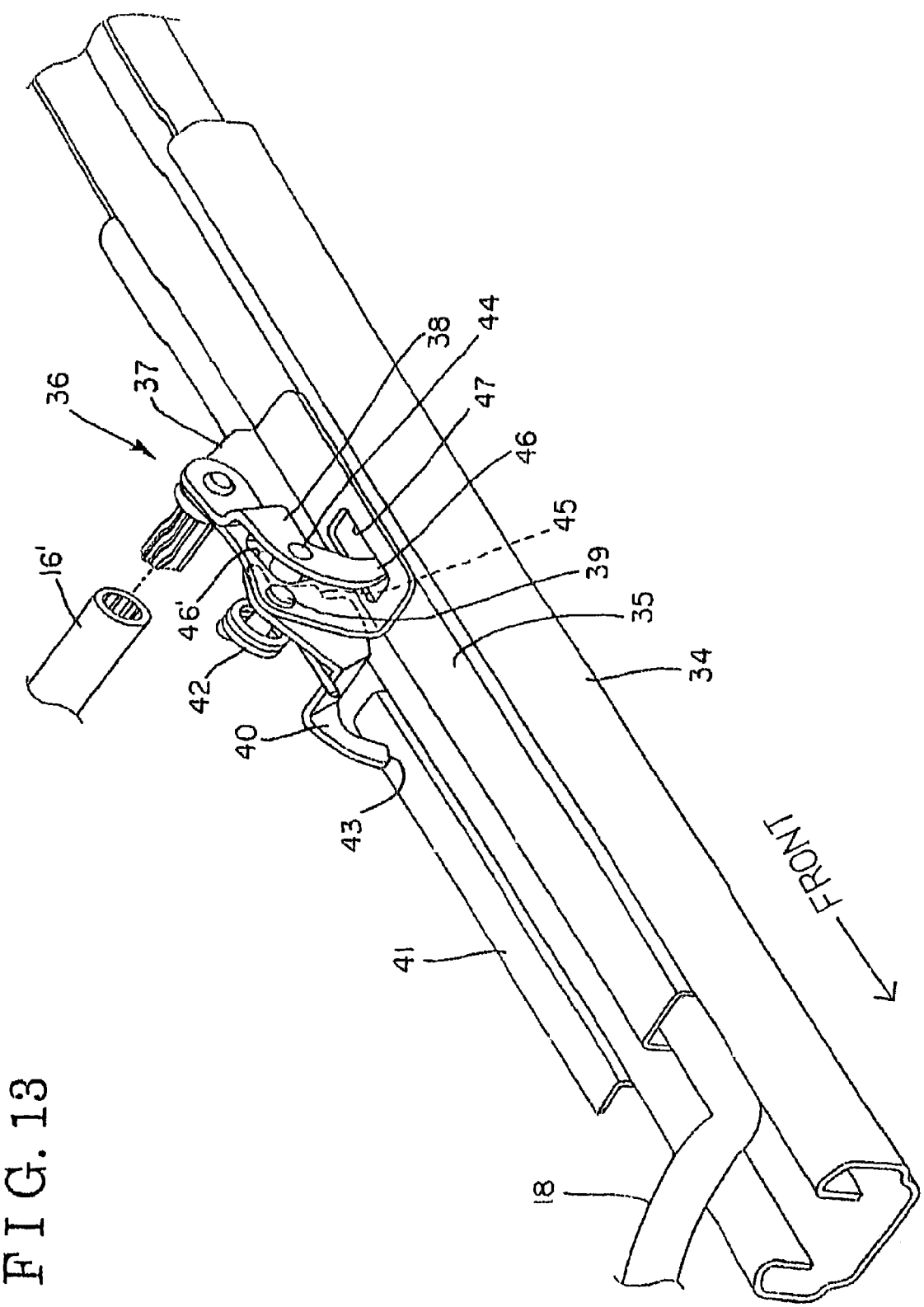
FIG. 13 is a perspective view of a link mechanism provided on a rail.

Next, a link mechanism 36 assembled to the other one of the pair of upper rails 35 slidable relative to the other one of the pair of lower rails 34 is explained with reference to FIGS. 13 and 14. The link mechanism 36 includes an L-shaped frame 37 fixed to a top face of the upper rail 35, an eighth link 38 (a first link member) serving as a sub-link that is connected to one end of the rod 16' and rotatably supported onto the frame 37, a ninth link 40 (a second link member) serving as a sub-link that is rotatably supported onto the frame 37 by means of a pin 39, and a bracket 41 provided on a vehicle inner side of the lower rail 34 and extending from a substantially middle portion to a front portion of the lower rail 34. The ninth link 40 is biased by a spring 42 so that a contact piece 43 formed on one end of the ninth link 40 makes elastically contact with a top face of the bracket 41. The eighth link 38 includes a pin 44 that is in contact with stepped portions 45 and 45' of the ninth link 40 so that the rotational angle of the ninth link 40 can be limited.

Figure 14:
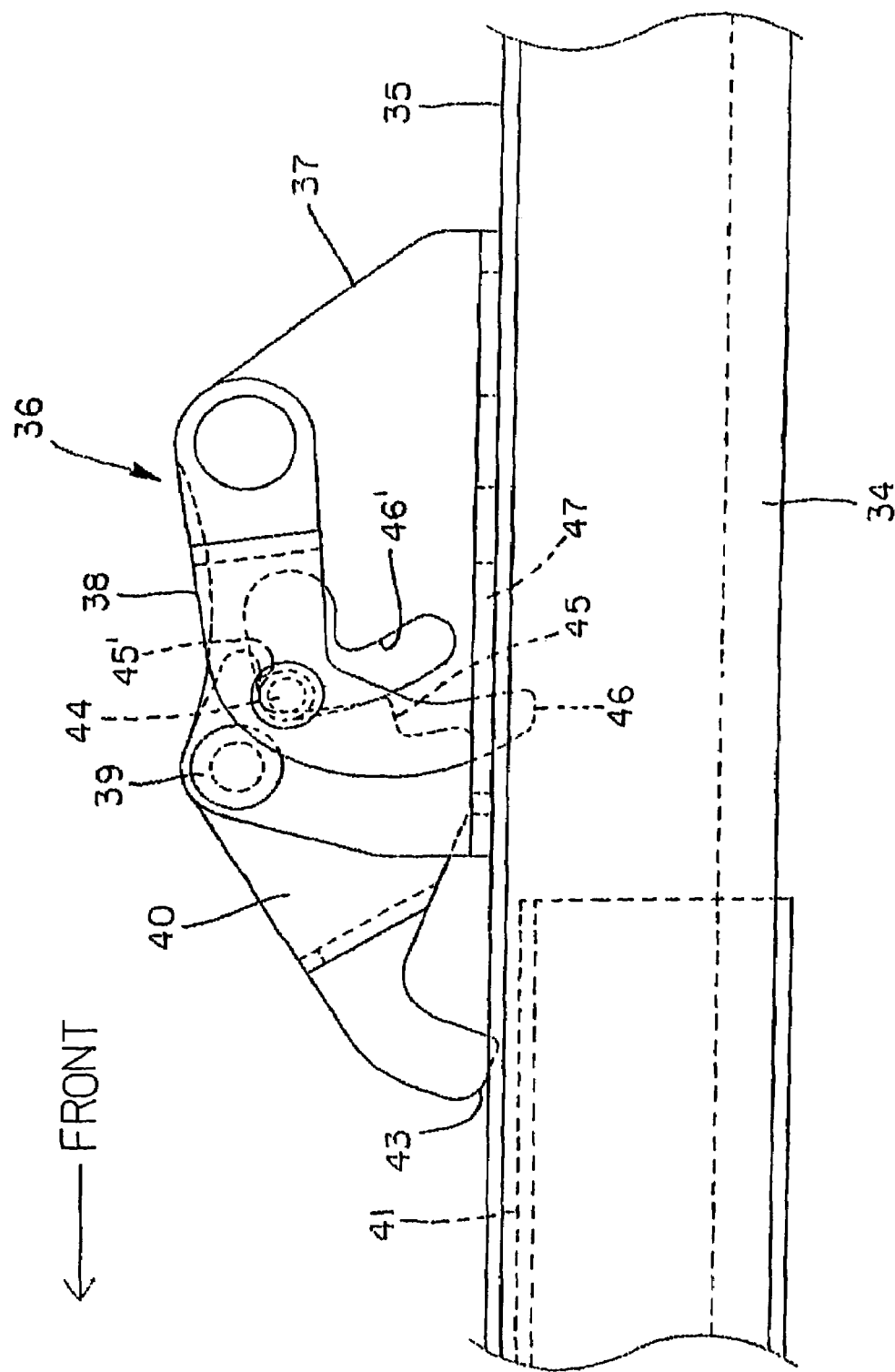
FIG. 14 is a front view of the link mechanism.

As shown in FIG. 14, the frame 37 includes a cam bore 46' having an L-shape when viewed from a front side and within which the pin 44 is positioned. An operation of the eighth link 38 that follows the rotation of the rod 16' interlocking with the fourth link 17 is guided and restricted by the cam bore 46'. The stepped portions 45 and 45' can make contact with the pin 44. In this case, a side face formed by the stepped portions 45 and 45' in connection with each other has a shape for matching the locus of movement of the pin 44.

A contact piece 46 formed on one end of the eighth link 38 can enter or exit from an opening 47 formed on the top face of the upper rail 35. The contact piece 46 makes contact with the operation handle 18 so that the operation handle 18 controls the engagement/disengagement of the upper rail 35 relative to the lower rail 34. When the upper rail 35 is moved forward and then the contact piece 43 of the ninth link 40 is separated from the top face of the bracket 41, the ninth link 40 is rotated in the counterclockwise direction (viewed in FIG. 13) with reference to the pin 39. The movement of the ninth link 40 is restricted by a contact between the pin 44, and the stepped portions 45 and 45'.

The forward movement and the restoring movement of the seat 30 for the walk-in operation by the link mechanism 36 are explained with reference to FIGS. 15 to 19.

Figure 15:
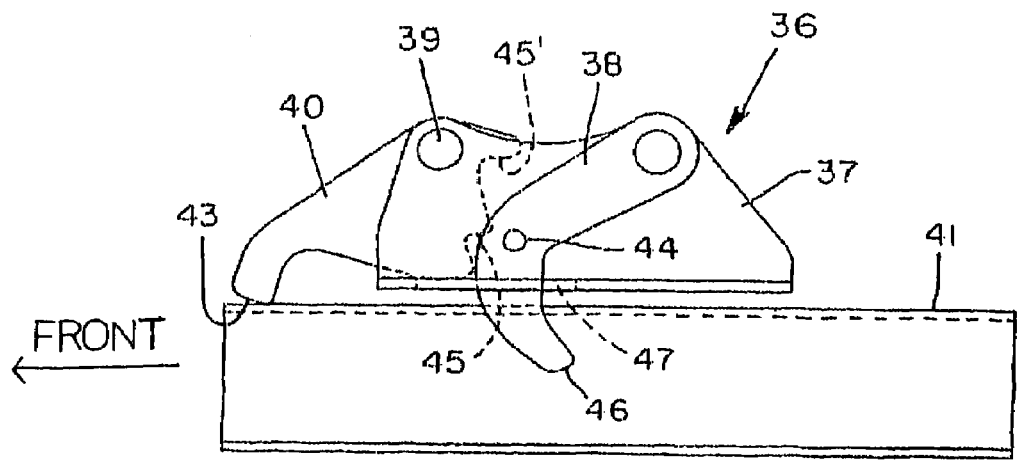
FIG. 15 is a front view showing the link mechanism in case that the seatback is turned down in the forward direction.

According to the rotation of the fourth link 17 in the counterclockwise direction (viewed in FIG. 2) due to the turning-down of the seatback 31 in the forward direction, the rod 16' is rotated in a circumferential direction so as to rotate the eighth link 38 in the counterclockwise direction as shown in FIG. 15. The operation handle 18 is then pushed down by means of the contact piece 46, thereby disengaging the upper rail 35 from the lower rail 34. The pin 44 is separated from the stepped portion 45', which means that the rotation of the ninth link 40 with reference to the pin 39 is possible. However, in a state of FIG. 15, the contact piece 43 is in contact with the top face of the bracket 41 and thus the rotation of the ninth link 40 is restricted.

Figure 16:
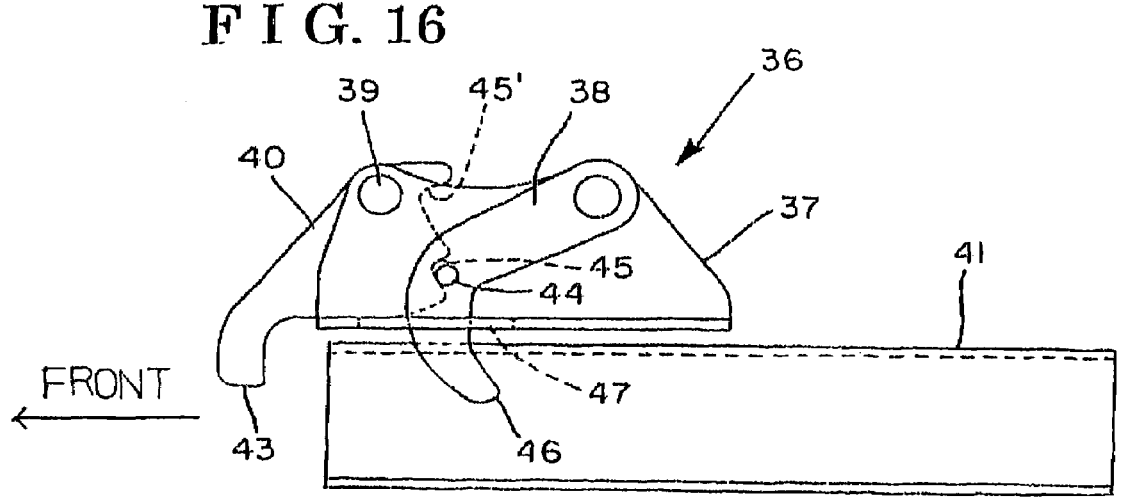
FIG. 16 is a front view showing the link mechanism in case that the seat is moved forward for the purposes of a walk-in operation.
Figure 17:
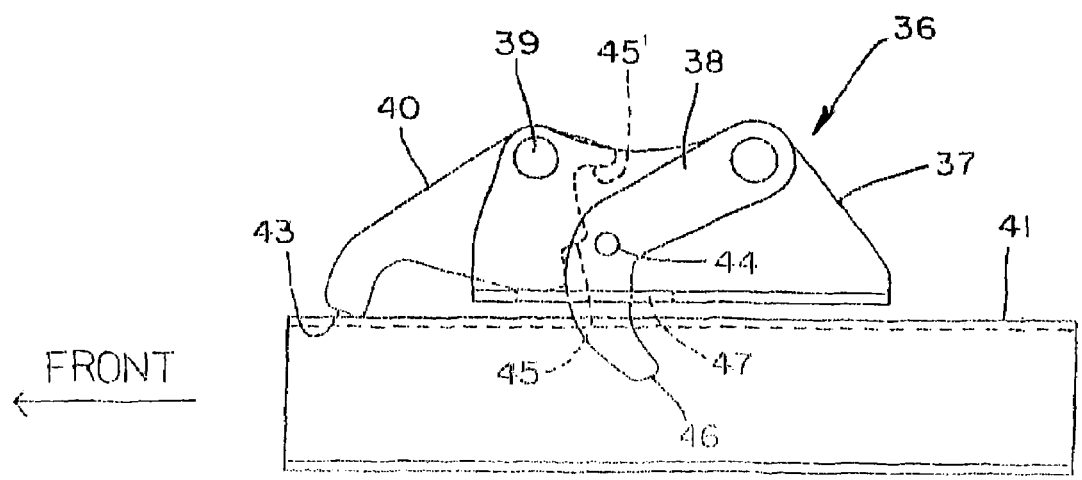
FIG. 17 is a front view of the link mechanism in case that the seat is on the way back to the memory position.
Figure 18:
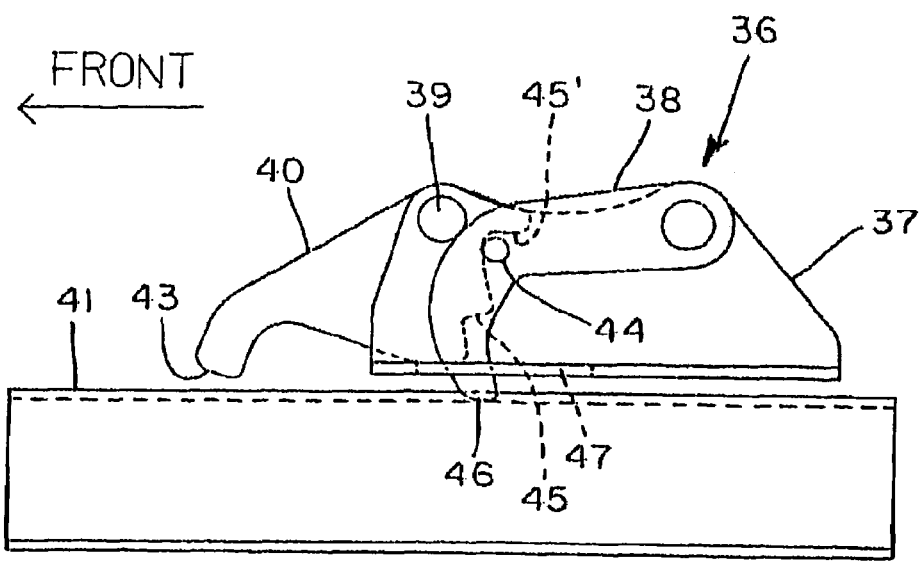
FIG. 18 is a front view of the link mechanism in case that the seat has returned to the memory position.

The forward movement of the seat 30 corresponds to the forward movement of the upper rail 35 as a movable rail for supporting the seat 30. Accordingly, the contact piece 43 of the ninth link 40 is separated from the bracket 41 extending from the substantially middle portion to the rear portion of the lower rail 34 as a fixed rail. Further, the ninth link 40 is rotated in the counterclockwise direction so that the stepped portion 45 of the ninth link 40 is in contact with the pin 44. The ninth link 40 is then maintained in a state shown in FIG. 16. In the state of FIG. 16, the upper rails 4 and 35 are in the unlocked state relative to the lower rails 2 and 34. That is, the upper rails 4 and 35 are constantly in the unlocked state relative to the lower rails 2 and 34 in the forward portion relative to the middle portion of the lower rails 2 and 34. Even if the operation handle 18 is operated in the above condition, the operation of the operation handle 18 is restricted since the pin 44 of the eighth link 38 is in contact with the stepped portion 45. The operation handle 18 cannot make the upper rails 4 and 35 in the locked state relative to the lower rails 2 and 34.

As shown in FIG. 3, when the seat 30 is moved in the rearward with the seatback 31 being turned down, the contact piece 43 of the ninth link 40 runs on the top face of the bracket 41 when the seat 30 reaches the middle portion of the lower rail 34. Accordingly, the stepped portion 45 of the ninth link 40 pushes down the pin 44, thereby generating the state shown in FIG. 17. The eighth link 38 is maintained at a position for keeping the upper rails 4 and 35 in the locked position relative to the lower rails 2 and 34. When the position of the seat 30 is moved back to the memory position and then the operation handle 18 is operated, the fourth link 17 and the eighth link 38 are rotated so as to acquire the locked state between the upper rails 3 and 35, and the lower rails 2 and 34.

An operation conducted when the seatback 31 of the seat 30, which has been moved in the forward direction on the lower rails 2 and 34, is turned up as shown in FIG. 6 is explained with reference to FIG. 19. According to this operation, the position of the seat 30 is restored to the original seating position with the seat 30 being turned up. In this case, the seat 30 is stopped in a substantially middle portion on the lower rail 34 and then moved rearward if necessary by means of a normal operation, i.e. by using the operation handle 18. Precisely, when the seatback 31 is turned up, the engagement between the fifth link 21 and the pin 28 is released since the seventh link 24 forcedly operates the fifth link 21. Then, the fourth link 17 fails to push down the operation handle 18 (see FIG. 10). In this case, however, the contact piece 43 of the ninth link 40 is separated from the bracket 41 and thus the contact piece 46 of the eighth link 38 maintains the force for pushing down the operation handle 18. Accordingly, the rod 16' can maintain the fourth link 17 in a position in which the upper rails 4 and 35, and the lower rails 2 and 34 are in the unlocked position. The seat 30 can be moved backward from the forward position as shown in FIG. 6 without operating the operation handle 18 even though the seatback 31 has been turned forward.

Figure 19:
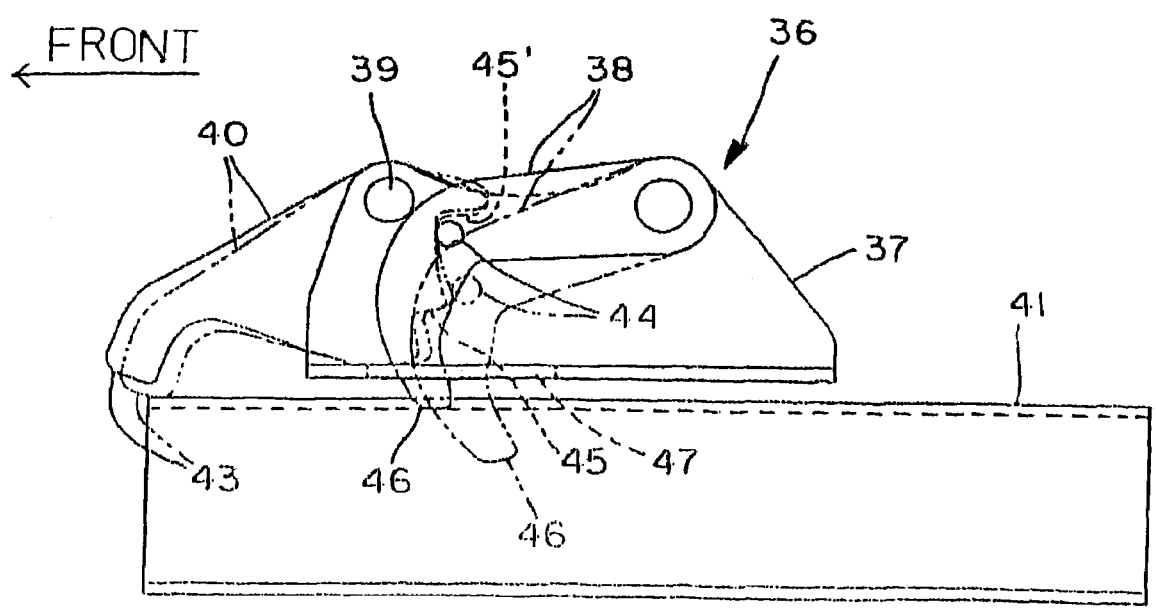
FIG. 19 is a front view of the link mechanism in case that the seat is moved rearward after the seatback is turned up.

When the seat 30 is moved backward, the contact piece 43 of the ninth link 40 runs on the top face of the bracket 41 (see FIG. 19). Then, the ninth link 40 is rotated in the clockwise direction, thereby causing the pin 44 to separate from the stepped portion 45 and then to make contact with the stepped portion 45'. The eighth link 38 is allowed to rotate in the clockwise direction accordingly. The rotation of the eighth link 38 causes the fourth link 17 to rotate via the rod 16' so as to engage the upper rails 4 and 35 with the lower rails 2 and 34 respectively. In the above state, if the seat 30 is desired to move further backward, the operation handle 18 is operated for the purposes of performing the normal operation of the seat 30 in which the seat 30 is moved backward from a state in which the upper rails and the lower rails are in the unlocked position.

When the seat 30 is positioned forward relative to the middle portion of the lower rails 2 and 34, and then moved forward after turning down the seatback 31 for the walk-in operation, the memory retaining runner 7 is maintained in the middle portion of the lower rails 2 and 34. Therefore, by moving the seat 3 backward with the seatback 31 being turned forward or turned up, the upper rails 4 and 35 engage with the lower rails 2 and 34 at a place where the memory retaining runner 7 is positioned.

According to the aforementioned embodiment, an enough space is acquired in front of the seat for the passenger to access or leave from the seat in case that the seatback is turned up or forward in the forward of the memory retaining runner 7. Thus, the locked state of the sliding operation of the upper rail 2 relative to the lower rail 4 is not required to be released by operating the operation handle 18. The seat 3 may be moved to a predetermined position in which the passenger can get onto or off from the seat.

In addition, according to the aforementioned embodiment, the seat 3 is stopped in a substantially middle portion on the lower rail 2 even if the seat back 31 is turned up in the forward of the memory runner 7 and then the seat 3 is moved backward. Therefore, the memory lock 9 may not be damaged. In addition, a position deviation of the memory retaining runner 7 due to the vibration of the vehicle, as well as error memory position, may not occur. Further, even if the seat back 31 is turned up in the forward of the memory runner 7 and then the seat 3 is moved backward through the normal operation of the seat 3, the first link 10 makes contact with the memory retaining runner 7, thereby avoiding the damage of the memory lock 9.

Moreover, since the second link 11 to the seventh link 24 are provided along the frame 5 with the seventh link 24 being provided at the most outside portion and along the longitudinal direction of the frame 5, the links provided between the seventh link 24 and the frame 5 are prevented from receiving the external force. The memory retaining runner 7 can be held on the fixed rail side by the memory lock 9, thereby surely maintaining the memory retaining runner 7 in the memory position. According to the aforementioned embodiment, the seat that has been moved in the forward for the walk-in operation can be stopped in a middle portion on the lower rail 2 and thus the passenger may easily access the front seat (passenger seat, for example) during the walk-in operation.

Moreover, according to the aforementioned embodiment, the memory mechanism and the lock/unlock mechanism are provided on one of the pair of rails while the link mechanism for preventing the operation of the lock/unlock mechanism is provided on the other one of the pair of rails. Thus, even though the seat is equipped with the memory mechanism, the seat can be moved back to the middle portion on the rail in the unlocked state of the sliding operation when the seat is moved forward from the rearward portion and then the seat back is turned up in the forward position. When the seat is moved forward from the middle portion or forward portion thereof for the walk-in operation, the seat can be moved rearward to the middle portion in the unlocked state of the sliding operation.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat sliding device for a vehicle for unlocking or retaining an unlocked state of a movable rail that supports a seat relative to a fixed rail by interlocking with a turning of a seat back in a forward direction or an operation of an operation handle, comprising:

a link mechanism provided at one of a pair of rails which are arranged in parallel with each other by keeping a predetermined distance therebetween; and a lock mechanism provided at the other one of the pair of rails; wherein after the seat is moved in the forward direction with the seat back being turned forward, the link mechanism makes the lock mechanism inoperative so that the seat can be moved in a rearward direction regardless of a state of the seat back being positioned in the forward.

2. A seat sliding device according to claim 1, wherein the link mechanism includes a first link member held on the other one of the pair of movable rails and a second link member held on the other one of the pair of movable rails and operating with the first link member, one end of the second link member being engageable and disengageable relative to a bracket, wherein the one end of the second link member disengages from the bracket by a forward movement of the seat.

3. A seat sliding device according to claim 2, wherein the bracket is positioned by extending from a substantially middle portion to a rear portion of the other one of the pair of fixed rails.

* * * * *